(12) United States Patent
Hood

(10) Patent No.: US 10,186,129 B2
(45) Date of Patent: Jan. 22, 2019

(54) LOCOMOTION SAFETY AND HEALTH ASSISTANT

(71) Applicant: Mary E. Hood, Alamosa, CO (US)

(72) Inventor: Mary E. Hood, Alamosa, CO (US)

( * ) Notice: Subject to any disclaimer, the term of this patent is extended or adjusted under 35 U.S.C. 154(b) by 0 days.

(21) Appl. No.: 15/096,270

(22) Filed: Apr. 11, 2016

(65) Prior Publication Data
US 2016/0300469 A1 Oct. 13, 2016

Related U.S. Application Data

(60) Provisional application No. 62/145,506, filed on Apr. 9, 2015.

(51) Int. Cl.
*G08B 6/00* (2006.01)
*G08B 21/02* (2006.01)

(52) U.S. Cl.
CPC .............. *G08B 21/02* (2013.01); *G08B 6/00* (2013.01)

(58) Field of Classification Search
CPC .. A45B 3/00; A45B 9/00; A61H 3/061; A61H 3/02
USPC ............................ 135/65–72; 701/431–433
See application file for complete search history.

(56) References Cited

U.S. PATENT DOCUMENTS

| | | | | |
|---|---|---|---|---|
| 3,545,467 A * | 12/1970 | Kwok | ....................... | F15C 1/08 137/829 |
| 4,280,204 A * | 7/1981 | Elchinger | .............. | A61H 3/061 135/76 |
| 4,858,125 A * | 8/1989 | Washizuka | ................ | A45B 3/00 135/65 |
| 5,097,856 A * | 3/1992 | Chi-Sheng | ............. | A61H 3/061 135/72 |
| 5,219,402 A * | 6/1993 | Kondo | ...................... | A45B 3/00 135/66 |
| 5,487,669 A * | 1/1996 | Kelk | ....................... | A61H 3/061 434/112 |
| 5,871,025 A * | 2/1999 | Richter | .................... | A45B 3/00 135/65 |
| 6,011,481 A * | 1/2000 | Luther | ..................... | A61H 3/02 135/66 |
| 6,489,605 B1 * | 12/2002 | Ritz | ......................... | A61F 9/08 250/221 |
| 6,745,786 B1 * | 6/2004 | Davis | ....................... | A45B 3/00 135/65 |
| 7,267,281 B2 * | 9/2007 | Hopkins | ................ | A61H 3/061 135/911 |

(Continued)

*Primary Examiner* — Albert K Wong

(57) ABSTRACT

A locomotion safety and health assistant can utilize a quad cane and have integrated thereon a suite of sensors, microcontrollers, power sources, external communication devices, lights, tactile communication devices, alerts and activation sensors. A plurality of environment sensors can monitor the terrain ahead, watching for obstacles or changes in elevation. The assistant can provide communication with the user to warn of any obstacles or dangers. A switch can allow the user to turn on a light that is directed to the front of the assistant and lights up the terrain ahead. The assistant can include a programmable medication alert. Additionally, a pulse sensor or other health sensor can be incorporated therein. Measurements therefrom can be compared to ranges and warnings communicated when outside of a safe range; thereby providing warning that it may not be safe to stand and walk as fall susceptibility is unduly high at present.

16 Claims, 5 Drawing Sheets

(56) References Cited

U.S. PATENT DOCUMENTS

| | | | | |
|---|---|---|---|---|
| 7,706,212 B1* | 4/2010 | Campbell | ............... | A61H 3/061 367/116 |
| 7,778,112 B2* | 8/2010 | Behm | ................... | A61H 3/061 135/911 |
| 8,397,737 B2* | 3/2013 | Evans | ..................... | A45B 9/00 135/65 |
| 8,467,674 B1* | 6/2013 | Ratner | ................... | F16M 11/28 396/310 |
| 8,483,956 B2* | 7/2013 | Zhang | ................... | A61H 3/061 700/245 |
| 8,627,839 B1* | 1/2014 | Martinez | ................. | A45B 3/00 135/66 |
| 8,825,389 B1* | 9/2014 | Campbell | ............... | A61H 3/061 701/433 |
| 8,974,232 B2* | 3/2015 | Behrenbruch | ........... | A45B 3/00 135/65 |
| 9,465,020 B2* | 10/2016 | Christian | ................ | G01W 1/14 |
| 2012/0279539 A1* | 11/2012 | Kim | ......................... | A45B 3/00 135/66 |
| 2013/0220392 A1* | 8/2013 | Gassert | ................. | A61H 3/061 135/66 |
| 2016/0120275 A1* | 5/2016 | Alexander | ............... | A45B 3/00 135/66 |
| 2016/0220153 A1* | 8/2016 | Annegarn | ............ | A61B 5/1117 |

* cited by examiner

LOCOMOTION SAFETY AND HEALTH ASSISTANT

CROSS-REFERENCE TO RELATED APPLICATIONS

This application claims the benefit of U.S. Provisional Application No. 62/145,506 entitled "Locomotion Safety and Health Assistant" and filed on Apr. 9, 2015, which is specifically incorporated by reference herein for all that it discloses and teaches.

TECHNICAL FIELD

The invention relates generally to the field of canes/walking assistance and health maintenance devices, and more particularly to a locomotion safety and health assistant for the elderly and others.

BACKGROUND

Canes, crutches, walking sticks, and similar locomotion aides have been available to assist the elderly (and others) in walking and otherwise moving about since time immemorial. Relatively recently, canes have been designed to be self-standing, utilizing multiple legs and feet (or ferrules) to enhance the stability of the cane itself and also that of the user thereof For example, a common quad cane is designed with a small rectangular platform attached at the bottom of the shaft and has four ferrules, one at each corner, which extend downwards therefrom and contact the ground.

However, traditional canes and even the newer enhanced canes (such as the quad cane mentioned above) have a number of limitations. Most canes are simple devices that provide only a supportive structure to help a user balance and/or to allow the user to support some of his or her weight with the arm/hand rather than via the legs/feet. Such simple canes address only one aspect of the locomotion/health care problem: that of unsteady walking. Yet there are many other aspects that can contribute to fall susceptibility for a given person: vision impairment, lessened sensitivity in the feet, lessened sense of balance, and increased susceptibility to changes in pulse rate and blood pressure. Traditional canes can not warn the vision impaired user of approaching obstacles, drop-offs, changes in elevation, etc. Nor do such traditional devices provide light to help the user navigate in dim, treacherous conditions. Additionally, prior art devices do not incorporate other health assistance devices that further facilitate safe locomotion, such as: a pulse rate sensor, logic to determine a safe pulse rate zone, warnings if the pulse rate is out of said zone, health data collection, alerts when it is time to take medication, temperature, blood pressure, oxygen saturation, or other enhancements.

What is needed is a locomotion safety and health assistant device that can address the above deficiencies.

SUMMARY

One embodiment of the locomotion safety and health assistant comprises a light-weight quad cane having an integrated suite of sensor(s), microcontroller(s), power source(s), external communication device(s), light(s), tactile communication device(s), alert(s) and activation sensor(s). A plurality of ultrasonic or similar sensors can effectively monitor the terrain ahead of a user, watching for obstacles or changes in elevation. The assistant can provide tactile feedback (or communication via touch/vibration sensing) or other communication with the user to warn of any obstacles or changes in elevation that are sensed. For example, a single vibration of the assistant's handle can alert the user to an approaching drop in elevation of the floor such as a set of stairs leading downwards. Similarly, a double vibration can provide a different alert for an approaching obstacle such as a basketball, a wall, a set of stairs leading upwards, etc. A glow-in-the-dark (or not) switch or force sensor can be incorporated just below the handle of the assistant (or in another handy location) that allows the user to turn on (and off) a light that is directed to the front of the assistant and lights up the terrain ahead. The assistant can include a programmable medication alert which chimes or otherwise communicates with the user when one or more times to take medication(s) have arrived. Additionally, a pulse sensor can be incorporated in the handle of the assistant. The pulse sensor can utilize, as an example, a light sensor that shines into a user's fingertip and measures changes in the reflected light in order to determine changes in blood flow, pulse rate, blood pressure, etc. Other types of sensors for measuring the health indicators of the user (e.g., blood oxygen, temperature, etc.) can be incorporated as well. Such measurements can be compared to safe ranges and the assistant can warn the user if one or more of the health indicators is in an unsafe range; thereby providing warning that it may not be safe to attempt to stand and walk as fall susceptibility is unduly high at present. A sharp three second vibration in the handle, three-pulse vibration, or other type of tactile or other communication (such as a flashing light, audio alarm, etc.) can be used to communicate the situation to the user. Advanced models can incorporate voice recognition and voice interaction to communicate with the user.

BRIEF DESCRIPTION OF THE DRAWINGS

The aforementioned and other features and objects of the present invention and the manner of attaining them will become more apparent and the invention itself will be best understood by reference to the following descriptions of a preferred embodiment and other embodiments taken in conjunction with the accompanying drawings, wherein.

DETAILED DESCRIPTION

Figure 1:
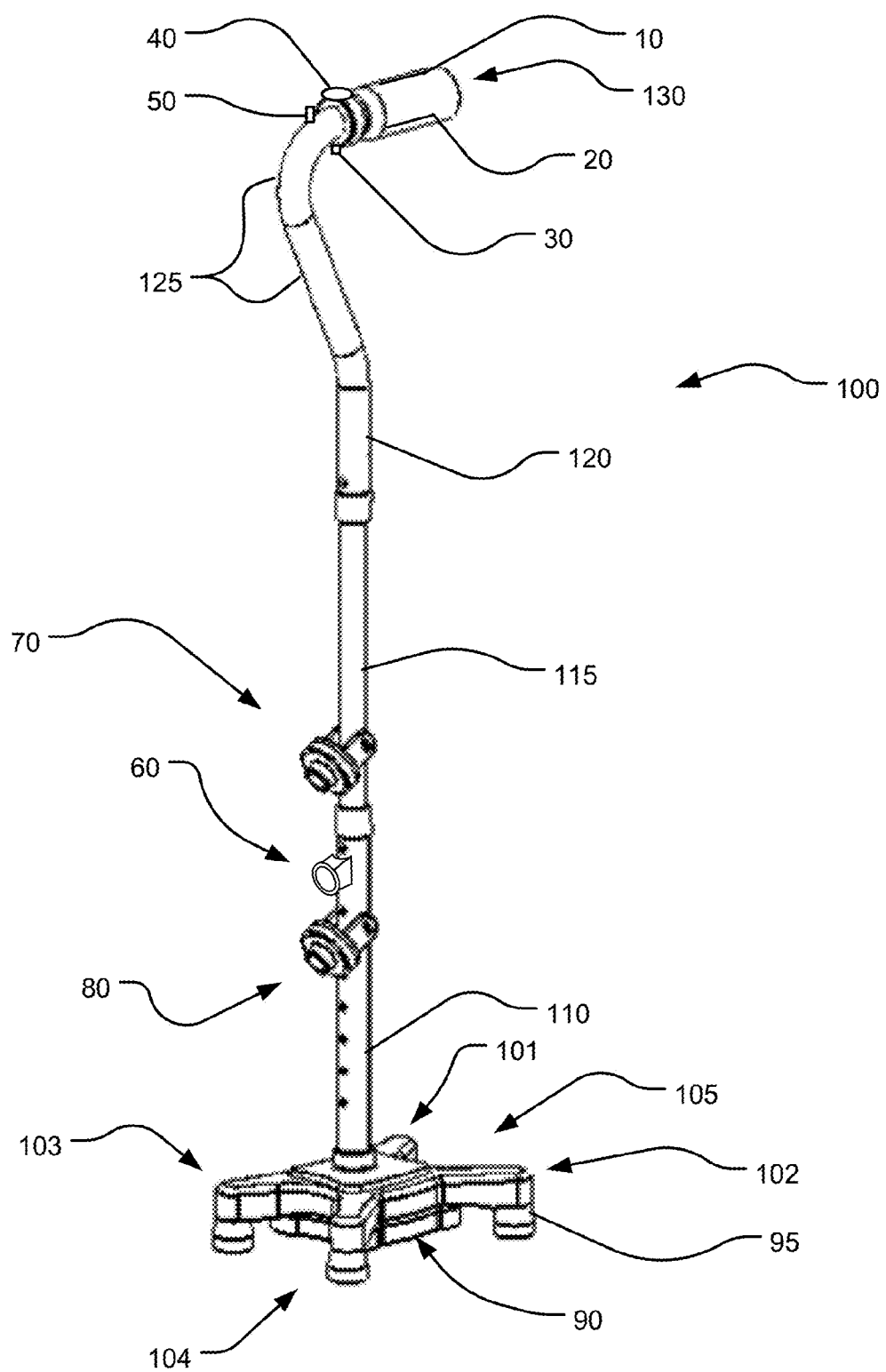
FIG. 1 illustrates a side perspective view of an exemplary embodiment of a locomotion safety and health assistant.

Referring now to the drawings, FIG. 1 illustrates a side perspective view of an exemplary embodiment of a locomotion safety and health assistant 200. The assistant 200 comprises a quad cane having a base 105, a lower support 110, a height adjustment 115, an upper support 120, a centering support 125 and a handle grip 130 Enhanced components of the assistant 200 can include a first handle communicator 10, a second handle communicator 20, a first force sensor 30, a health sensor 40, a second force sensor 50, a light 60, a first environment sensor 70, a second environment sensor 80, a microcontroller and associated electronics 90, third force sensor 95, and a plurality of legs with ferrules 101, 102, 103, and 104. In another embodiment, the base 105 attaches directly to a cane 100, the cane comprising potentially one or more of the subcomponents 110, 115, 120, 125 described above. Basically, the cane 100 can comprise any components between the base and the handle grip.

The assistant 200 can utilize a light-weight quad cane. The cane can have a plurality of legs 101, 102, 103, and 104. More or fewer legs are contemplated in other embodiments. Integrated into the assistant 200 can be a base 105 that can have therein a microcontroller, battery, Bluetooth (or other wireless technology for exchanging data) controller, and accompanying wires/electronics. These components communicate with the sensors and other components in order to create the 'smart cane' assistant of the present invention. They interpret signals from the sensors and initiate communications with the user, control alarms and notifications, power and control the light(s), etc.

Towards the bottom of the assistant 200 can be integrated a light 60 which can be a bright white LED or other helpful lighting device that is pointed forwards and downwards to help light the terrain and other items ahead. The user can activate the light in various ways and the light switch or force sensor can be glow-in-the-dark to assist the user in locating the activator in dark conditions. In some embodiments, the angle of the light can be adjusted and/or additional lighting features can be integrated into the assistant 200.

Near (for example, just below) the handle can be a small button which can comprise the first force sensor 30. When the first force sensor 30 is pushed, it can activate the health sensor 40. Alternatively, the first force sensor can operate the light 60 or some other device. In yet another embodiment, a second force sensor 50 can operate the light. Alternatively, the second force sensor 50 can activate the health sensor 40 or some other device (especially in the case when the health sensor 40 is activated by touch or some other means).

The handle grip 130 can incorporate vibration motors which can be the first handle communicator 10 and the second handle communicator 20. A small health sensor 40 can be a pulse sensor or other similar sensor that can determine changes in the user's blood flow, pulse rate, blood pressure, etc.

Two small, cylindrical sensors, about the size of large marbles can be located near the light 60. They are the PING environment sensors 70 and 80. These can be two ultrasonic sensors that effectively monitor for obstacles or changes in elevation ahead of their user. The ultrasonic sensors use sound, and its echo, to determine distances (other types of sensors are contemplated, e.g., lasers and light sensors that determine range, such as laser range finders could be used). Triggered by the third force sensor 95 located on the bottom of the assistant 200, the ultrasonic sensors run every time the cane is placed on the floor (or at other intervals, or even continuously, if needed). One of the ultrasonic sensors points slightly downward, and is used to alert users of potential hazards ahead. The other sensor points straight forward (or even upwards, in some embodiments), measuring distances to larger bodies such as walls and beds. Data from this second ultrasonic sensor cancels any signal from the first, so that a user is not receiving constant warnings about approaching walls or other obvious objects. If approaching stairs, obstacles, or other hazards are imminent, vibration motors in the handle run for two seconds (other time periods are contemplated). Additional communication means and methods are contemplated in other embodiments. The environment sensors 70 and 80 can be set at different angles than described above in order to better sense particular things. For example, if a patient has problems with stairs going or other drops in elevation, then the environment sensors can be adjusted to better sense this particular type of danger.

The health sensor 40 can be incorporated into the handle grip 130 and can be triggered by a first force sensor 30 that is activated when pressure is applied on the handle by the user's finger. In another embodiment, simply placing the thumb on the health sensor 40 causes activation. If a pulse sensor is used, it works by shining a light into the user's fingertip, and measuring changes in the reflected light. Because fall susceptibility due to changes in blood flow is most likely when an elderly person stands, the pulse sensor can be configured to run only upon initial pressure on the force sensor. If the sensor reads a pulse rate outside of normal parameters for an elderly adult (or for the particular user), the first handle communicator 10 and second handle communicator 20 can vibrate off and on for three seconds to alert their user of the change. Additional communication means and methods are contemplated.

A Bluetooth connection or other external communicator can be used to record and communicate data gathered from the health sensor and other sensors to be later used by a doctor or caregiver.

The cane can also incorporate a medication alert, tailored to the timing of the user, to alert them when it is time for them to take their medications. This can be integrated into the microcontroller and electronics 90 or can be inserted elsewhere in the supports 110 and 120 as desired. The microcontroller and associated electronics 90 can incorporate one or more power sources, which can be rechargeable and/or replaceable.

The quad cane has a base 105 which connects the lower support 110 portion of the cane with the legs. The lower support 110 portion can attach to a height adjustment 115 portion which allows the cane to be lengthened or shortened depending on the needs of the user. An upper support 120 attaches between the adjustment 115 and the centering support 125. The centering support 125 places the handle grip 130 more directly above the center of the base/legs.

Figure 2:
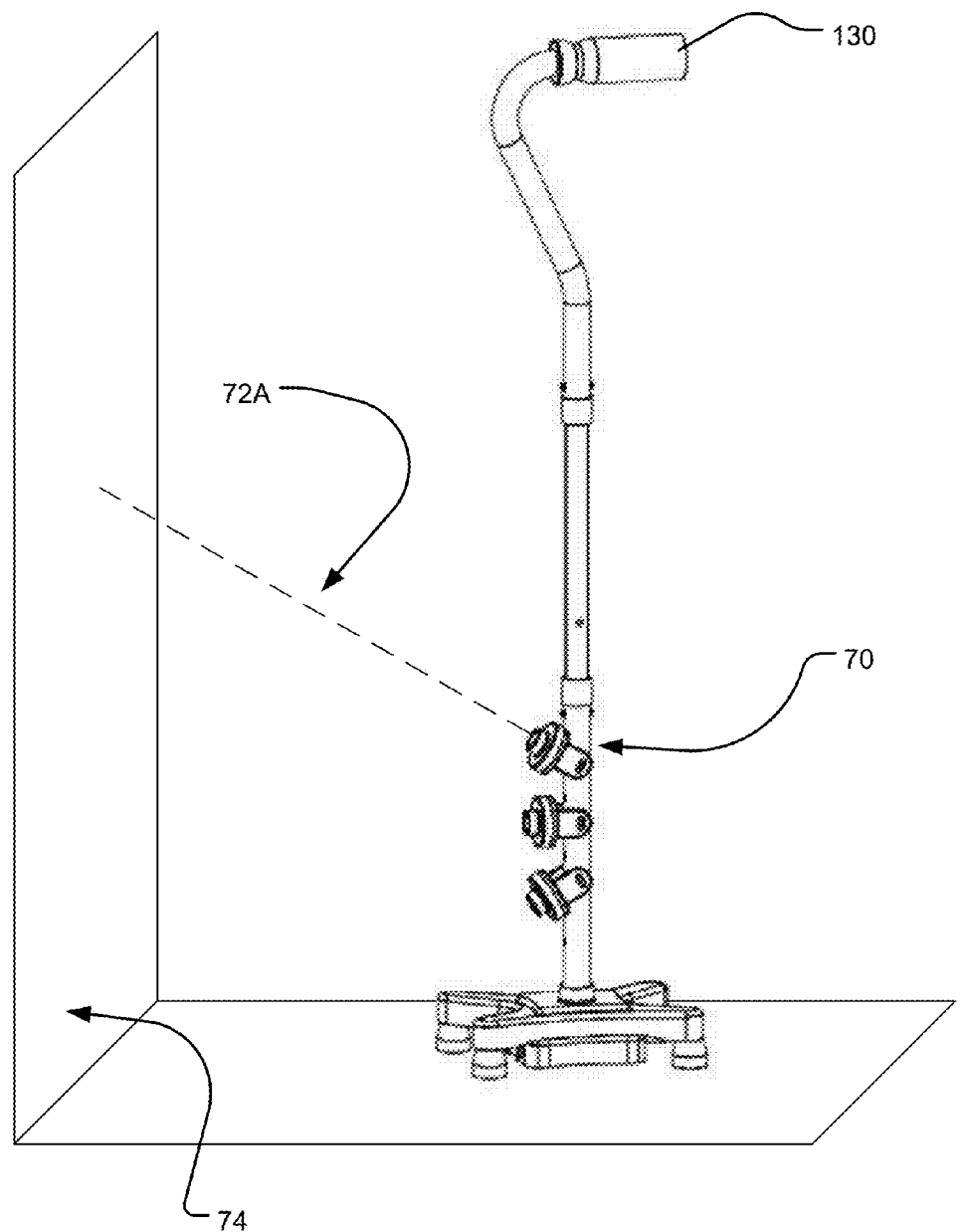
FIG. 2 illustrates a side perspective view of an exemplary embodiment of a locomotion safety and health assistant sensing no nearby obstacles ahead.

FIG. 2 illustrates a side perspective view of an exemplary embodiment of a locomotion safety and health assistant 200 sensing no nearby obstacles ahead. The assistant 200 utilizes one or more environment sensors 70 to send out a first sensing beam 72A. This beam strikes an approaching obstacle wall 74, but the assistant 200 measures the length of sensing beam 72A and finds that the sensing beam 72A is traveling beyond a set safety distance, so no threat is reported. Compare this to the shortened sensing beam 72B in FIG. 3. Note that since the upcoming terrain contains no nearby obstacle, no warning is being provided to the user in FIG. 2. Compare this with FIG. 3, below, when a warning condition is sensed.

Figure 3:
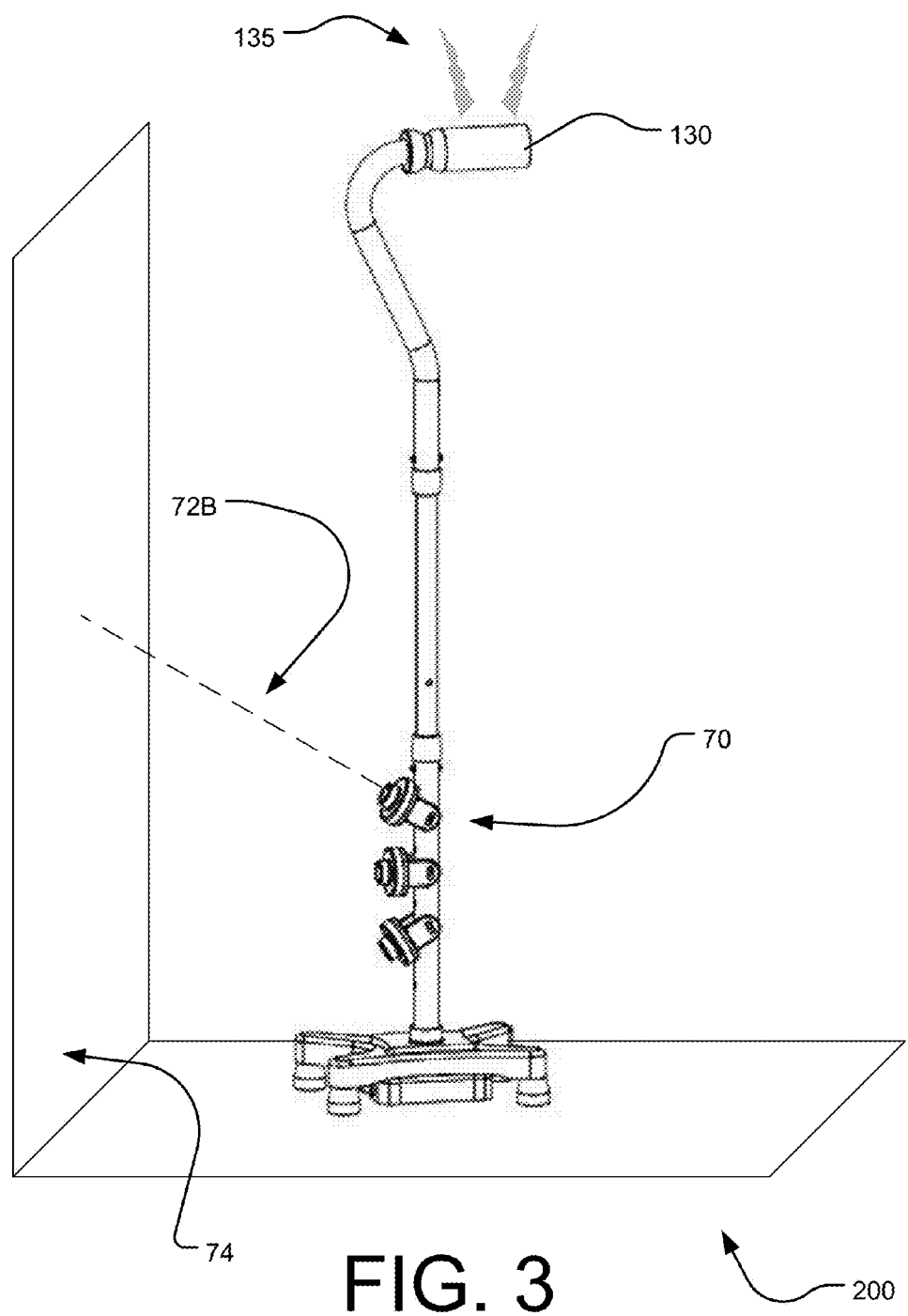
FIG. 3 illustrates a side perspective view of an exemplary embodiment of a locomotion safety and health assistant sensing an obstacle or change in elevation ahead and warning the user thereof.
Figure 5:
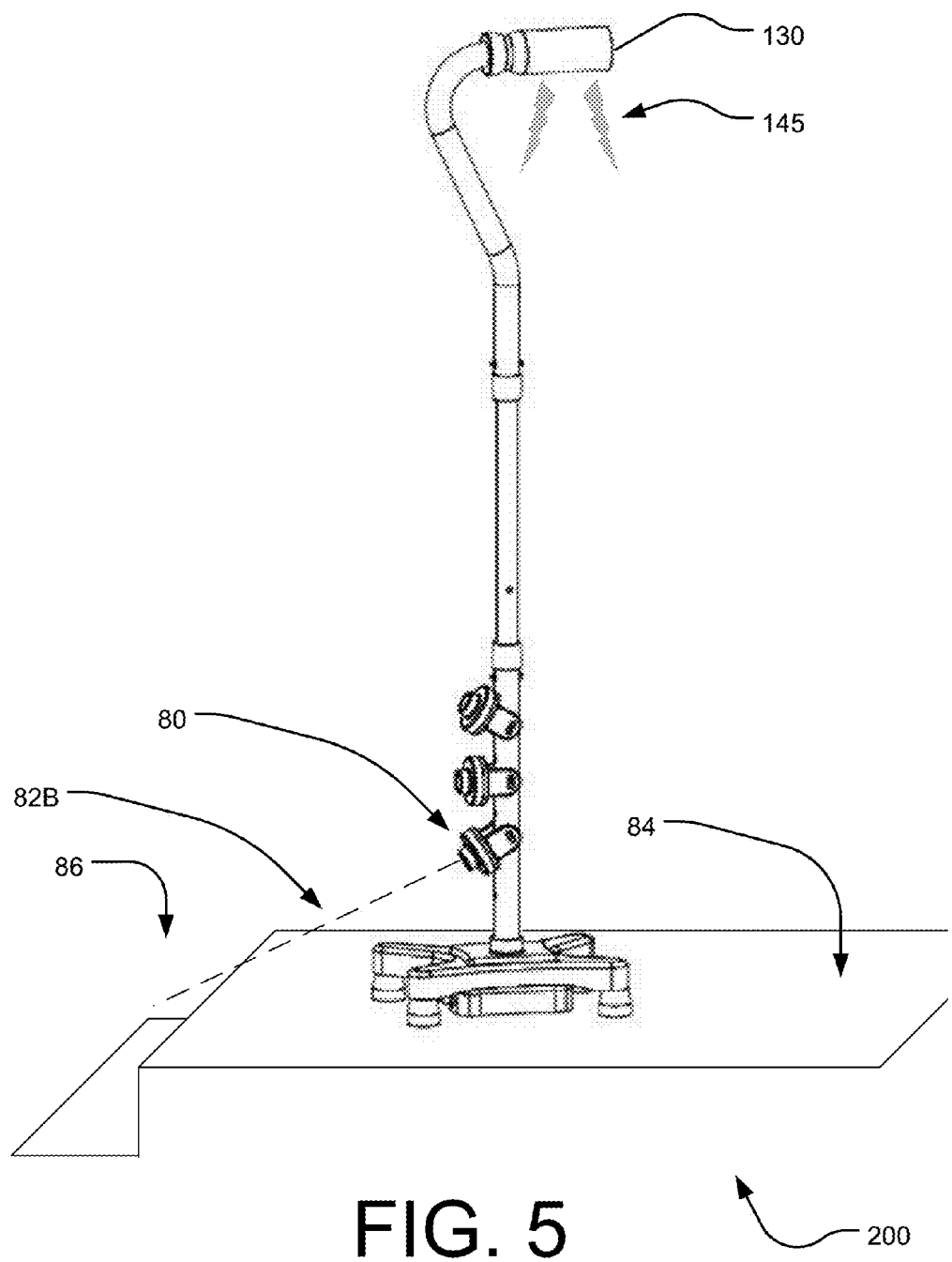
FIG. 5 illustrates a side perspective view of an exemplary embodiment of a locomotion safety and health assistant sensing a drop in elevation ahead and warning the user thereof.

FIG. 3 illustrates a side perspective view of an exemplary embodiment of a locomotion safety and health assistant 200 sensing an obstacle 74 or change in elevation ahead and warning 135 the user thereof. In this FIG., the obstacle 74 is a short wall and one or more of the first and second handle communicators in the handle 130 are vibrating warning 135 to communicate the danger to the user. The sensing beam 72B can utilize ultrasound or other radiation, ambient light, etc. Furthermore, the beam 72B can trigger when an obstacle is found within a certain distance from the assistant. For example, when an obstacle is found within 94 centimeters of the assistant 200, a warning vibration 135 can be given. Compare the shortened length of 72B in FIG. 3 with the longer 72A in FIG. 2 and note that the length of 72A is beyond the threat distance so no warning is communicated to the user in FIG. 2, while in FIG. 3 a warning 135 is issued. Also note that the handle can contain more than one handle communicator. In this example, only the upper handle communicator 10 (see FIG. 1) is activated. In FIG. 5, only the lower handle communicator 20 is activated. Other communications are contemplated.

Figure 4:
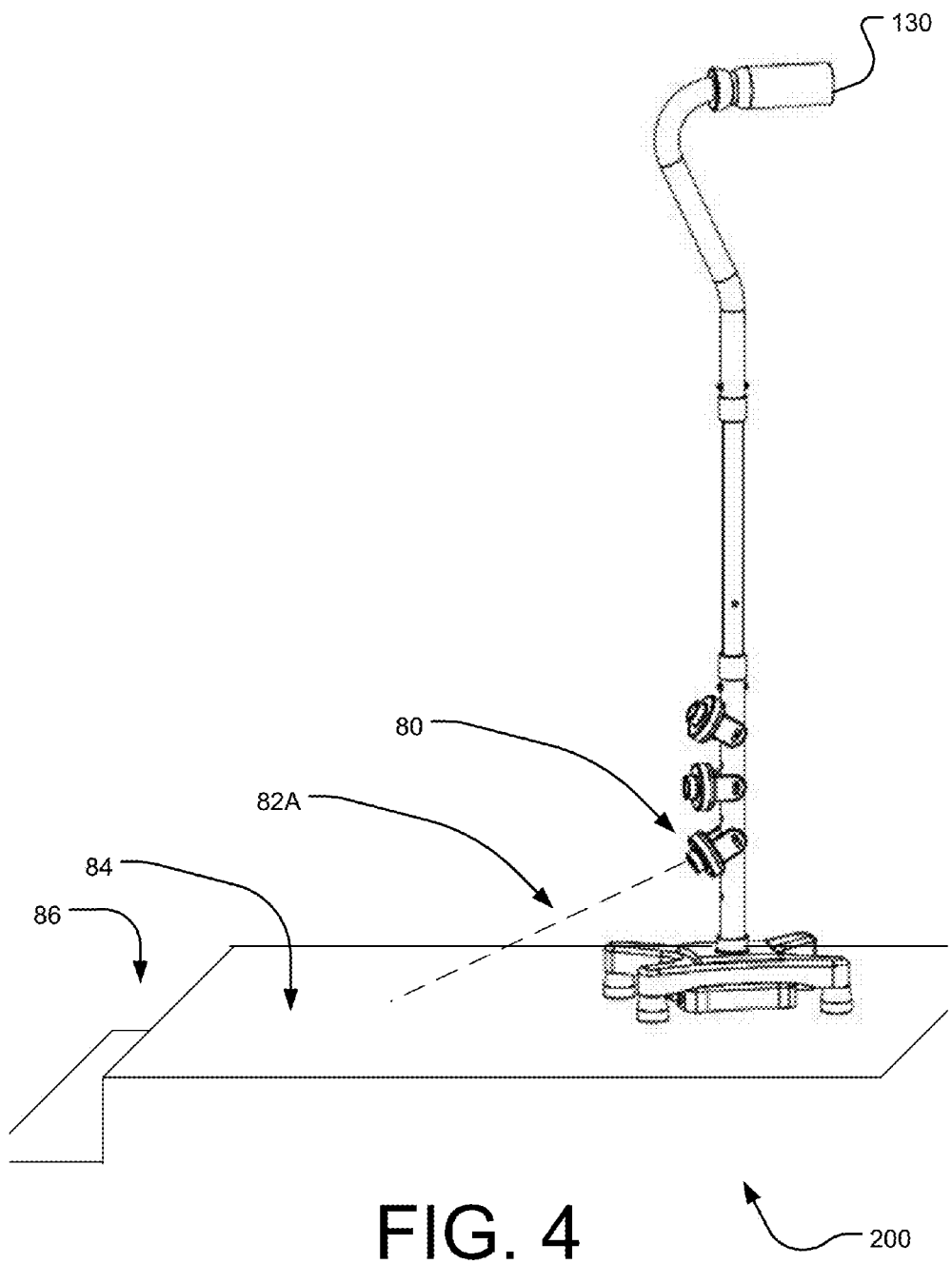
FIG. 4 illustrates a side perspective view of an exemplary embodiment of a locomotion safety and health assistant sensing level ground ahead.

FIG. 4 illustrates a side perspective view of an exemplary embodiment of a locomotion safety and health assistant 200 sensing level ground ahead. In this case, the level ground is found within a set distance; for example, between 94 and 108 centimeters ahead. Compare this with FIG. 5, below, when a warning condition is sensed. In FIG. 4, a second sensing beam 82A is used by the second environment sensor 80. Since the ground ahead is level, the length of sensing beam 82A remains approximately constant during each sensing session, so no threat or warning is communicated to the user in FIG. 4. However, the user is approaching a step down ahead and the assistant will warn of this soon, see FIG. 5.

FIG. 5 illustrates a side perspective view of an exemplary embodiment of a locomotion safety and health assistant 200 sensing a drop in elevation ahead 86 and warning 145 the user thereof. In this FIG., the drop in elevation 86 is a down-step and at least one of the communicators in the handle 130 are vibrating a warning 145 to communicate the danger to the user. The sensing beam 82B is longer in FIG. 5 than 4, and hence the assistant 200 can sense the drop. The second environment sensor 80 can utilize ultrasound or other radiation, ambient light, etc. Furthermore, the beam 82B can trigger when the drop in elevation 86 is found within a certain distance from the assistant 200. For example, when the drop is found beyond 108 centimeters of the assistant 200, a warning vibration 145 can be given.

While particular embodiments have been described and disclosed in the present application, it is clear that any number of permutations, modifications, or embodiments may be made without departing from the spirit and the scope of this disclosure.

Particular terminology used when describing certain features or aspects of the embodiments should not be taken to imply that the terminology is being redefined herein to be restricted to any specific characteristics, features, or aspects with which that terminology is associated. In general, the terms used in the following claims should not be construed to be limited to the specific embodiments disclosed in the specification, unless the above Detailed Description section explicitly defines such terms. Accordingly, the actual scope of the claims encompasses not only the disclosed embodiments, but also all equivalent ways of practicing or implementing the claimed subject matter.

The above detailed description of the embodiments is not intended to be exhaustive or to limit the invention to the precise embodiment or form disclosed herein or to the particular field of usage mentioned in this disclosure. While specific embodiments of, and examples for, the invention are described above for illustrative purposes, various equivalent modifications are possible within the scope of the invention, as those skilled in the relevant art will recognize Also, the teachings of the invention provided herein can be applied to other systems, not necessarily the system described above.

The elements and acts of the various embodiments described above can be combined to provide further embodiments.

Any patents, applications and other references that may be listed in accompanying or subsequent filing papers, are incorporated herein by reference. Aspects of the invention can be modified, if necessary, to employ the systems, functions, and concepts of the various references to provide yet further embodiments of the invention.

In light of the above "Detailed Description," the Inventor may make changes to the invention. While the detailed description outlines possible embodiments of the invention and discloses the best mode contemplated, no matter how detailed the above appears in text, the invention may be practiced in a myriad of ways. Thus, implementation details may vary considerably while still being encompassed by the spirit of the invention as disclosed by the inventor. As discussed herein, specific terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

The above specification, examples and data provide a description of the structure and use of exemplary implementations of the described articles of manufacture and methods. It is important to note that many implementations can be made without departing from the spirit and scope of the invention.

What is claimed is:

1. A locomotion safety and health assistant, comprising:
a base connected to a plurality of legs;
extending generally upwards from the base is a cane;
attached at a distal end of the cane is a handle grip;
a first handle vibration motor is configured within the handle grip and provides tactile feedback to the user to communicate at least a threat warning from the assistant to the user via tactile movement of the handle grip;
an ultrasonic distance sensor attached to the assistant and pointing forwards and downwards;
the ultrasonic distance sensor sensing an approaching drop in elevation of a ground surface such as an open staircase leading downwards;
a base force sensor located on the bottom of the assistant, and activating each time the assistant is placed down on a surface;
the base force sensor triggering the ultrasonic distance sensor to activate each time the base force sensor is activated;
a microcontroller in electronic communication with the ultrasonic distance sensor and the first handle vibration motor; and
the microcontroller interprets incoming data from the ultrasonic distance sensor and communicates any threat of an approaching downwards opening staircase interpreted to be contained therein to the first handle vibration motor which then communicates the threat warning to the user.

2. The locomotion safety and health assistant of claim 1, wherein the cane further comprises:
a lower support attached at a distal end to the base and at a proximal end to a height adjustment;

the height adjustment allowing the user to adjust a distance between the handle grip and the base;

an upper support attached at a distal end of the height adjustment; the upper support attaching at a distal end thereof to a centering support; and the centering support attaching to the handle grip.

3. The locomotion safety and health assistant of claim 1, further comprising:

a handle communicator configured within the handle grip and communicating at least a second threat warning from the assistant to the user.

4. The locomotion safety and health assistant of claim 2, further comprising:

a handle communicator configured within the handle grip and communicating at least a second threat warning from the assistant to the user.

5. The locomotion safety and health assistant of claim 1, further comprising:

a first force sensor attached in proximity to the handle grip so that the user can easily activate the first force sensor with a hand utilizing the handle grip; and when the first force sensor is activated, the first force sensor actuates at least one of a health sensor and a light.

6. The locomotion safety and health assistant of claim 2, further comprising:

a first force sensor attached in proximity to the handle grip so that the user can easily activate the first force sensor with a hand utilizing the handle grip; and when the first force sensor is activated, the first force sensor actuates at least one of a health sensor and a light.

7. The locomotion safety and health assistant of claim 3, further comprising:

a first force sensor attached in proximity to the handle grip so that the user can easily activate the first force sensor with a hand utilizing the handle grip; and when the first force sensor is activated, the first force sensor actuates at least one of a health sensor and a light.

8. The locomotion safety and health assistant of claim 4, further comprising:

a first force sensor attached in proximity to the handle grip so that the user can easily activate the first force sensor with a hand utilizing the handle grip; and when the first force sensor is activated, the first force sensor actuates at least one of a health sensor and a light.

9. The locomotion safety and health assistant of claim 5, further comprising:

a second force sensor attached in proximity to the handle grip so that the user can easily activate the second force sensor with the hand utilizing the handle grip; and when the second force sensor is activated, the second force sensor actuates at least one of the health sensor and the light.

10. The locomotion safety and health assistant of claim 6, further comprising:

a second force sensor attached in proximity to the handle grip so that the user can easily activate the second force sensor with the hand utilizing the handle grip; and when the second force sensor is activated, the second force sensor actuates at least one of the health sensor and the light.

11. The locomotion safety and health assistant of claim 7, further comprising:

a second force sensor attached in proximity to the handle grip so that the user can easily activate the second force sensor with the hand utilizing the handle grip; and when the second force sensor is activated, the second force sensor actuates at least one of the health sensor and the light.

12. The locomotion safety and health assistant of claim 8, further comprising:

a second force sensor attached in proximity to the handle grip so that the user can easily activate the second force sensor with the hand utilizing the handle grip; and when the second force sensor is activated, the second force sensor actuates at least one of the health sensor and the light.

13. The locomotion safety and health assistant of claim 1, further comprising:

a light attached to at least one of the base, lower support, plurality of legs, height adjustment, upper support, centering support, and handle grip.

14. The locomotion safety and health assistant of claim 2, further comprising:

a light attached to at least one of the base, lower support, plurality of legs, height adjustment, upper support, centering support, and handle grip.

15. The locomotion safety and health assistant of claim 3, further comprising:

a light attached to at least one of the base, lower support, plurality of legs, height adjustment, upper support, centering support, and handle grip.

16. The locomotion safety and health assistant of claim 4, further comprising:

a light attached to at least one of the base, lower support, plurality of legs, height adjustment, upper support, centering support, and handle grip.

\* \* \* \* \*